US012738784B2

(12) United States Patent
Lin et al.

(10) Patent No.: US 12,738,784 B2
(45) Date of Patent: Sep. 15, 2026

(54) MOTOR

(71) Applicant: NIDEC CORPORATION, Kyoto (JP)

(72) Inventors: Hsiu-Ying Lin, Taipei City (TW); Guo-Jhih Yan, Taipei City (TW); Keng-Chang Wu, Taipei City (TW); Kuo-Min Wang, Taipei City (TW); Sheng-Tse Wu, Taipei City (TW)

(73) Assignee: NIDEC CORPORATION, Kyoto (JP)

( * ) Notice: Subject to any disclaimer, the term of this patent is extended or adjusted under 35 U.S.C. 154(b) by 214 days.

(21) Appl. No.: 18/540,895

(22) Filed: Dec. 15, 2023

(65) Prior Publication Data

US 2024/0213835 A1 Jun. 27, 2024

(30) Foreign Application Priority Data

Dec. 21, 2022 (JP) ................................ 2022-204440

(51) Int. Cl.

| | |
|---|---|
| ***H02K 1/27*** | (2022.01) |
| ***H02K 1/2798*** | (2022.01) |
| ***H02K 1/28*** | (2006.01) |
| ***H02K 21/24*** | (2006.01) |

(52) U.S. Cl.

CPC ............ *H02K 1/2798* (2022.01); *H02K 1/28* (2013.01); *H02K 21/24* (2013.01)

(58) Field of Classification Search

CPC ........ H02K 1/2798; H02K 1/28; H02K 21/24; H02K 1/146; H02K 1/27; H02K 21/16

See application file for complete search history.

(56) References Cited

U.S. PATENT DOCUMENTS

| | | | | |
|---|---|---|---|---|
| 2007/0080598 A1* | 4/2007 | Naruse | H02K 1/2795 310/156.32 |
| 2011/0260566 A1* | 10/2011 | Odvarka | H02K 1/2796 29/598 |
| 2017/0047792 A1 | 2/2017 | Klassen et al. | |
| 2017/0047793 A1 | 2/2017 | Klassen et al. | |
| 2017/0047794 A1 | 2/2017 | Klassen | |
| 2017/0047798 A1 | 2/2017 | Klassen | |
| 2017/0047821 A1 | 2/2017 | Klassen | |

(Continued)

FOREIGN PATENT DOCUMENTS

| | | |
|---|---|---|
| JP | 2006166634 A | 6/2006 |
| JP | 2014155373 A | 8/2014 |
| JP | 2015039251 A | 2/2015 |

*Primary Examiner* — Thomas Truong

(74) *Attorney, Agent, or Firm* — HAUPTMAN HAM, LLP

(57) ABSTRACT

A motor includes a rotor rotatable about a central axis, and a stator located on one axial side of the rotor. The rotor includes a plurality of side magnets whose magnetization direction is a circumferential direction and that are arranged in the circumferential direction, and a plurality of core pieces disposed between the side magnets in the circumferential direction. The core piece includes a core piece main body that is in close contact with side surfaces of the side magnets on a pair of side surfaces facing both sides in the circumferential direction, and an extended tooth portion located on one axial side of the core piece main body. The extended tooth portion protrudes to one axial side with respect to a surface facing the one axial side of the side magnet, and has a larger width dimension in the circumferential direction than that of the core piece main body.

17 Claims, 12 Drawing Sheets

(56) References Cited

U.S. PATENT DOCUMENTS

| | | | |
|---|---|---|---|
| 2017/0133891 | A1 | 5/2017 | Klassen |
| 2017/0187254 | A1 | 6/2017 | Klassen |
| 2019/0214883 | A1 | 7/2019 | Klassen et al. |
| 2019/0288580 | A1 | 9/2019 | Klassen |
| 2019/0288587 | A1 | 9/2019 | Klassen et al. |
| 2019/0305617 | A1 | 10/2019 | Brahmavar |
| 2020/0144880 | A1 | 5/2020 | Klassen |

* cited by examiner

MOTOR

CROSS-REFERENCE TO RELATED APPLICATIONS

The present application claims priority under 35 U.S.C. § 119 to Japanese Patent Application No. 2022-204440 filed on Dec. 21, 2022, the entire content of which is incorporated herein by reference.

FIELD OF THE INVENTION

The present disclosure relates to a motor.

BACKGROUND

An axial gap motor in which a rotor and a stator face each other in an axial direction has advantages such as compact structure, small volume, light weight, and high torque density. Conventionally, as a rotor of an axial gap motor, a rotor in which a permanent magnet and an iron core whose magnetization direction is a circumferential direction are alternately arranged in the circumferential direction is known. In a rotor having a conventional structure, an iron core functions as a magnetic pole of the rotor.

In the rotor of the conventional structure, when the iron core is enlarged in the circumferential direction, a surface through which the magnetic flux flows toward the stator can be widely secured, so that the magnetic flux can be easily used effectively, and the efficiency of the motor can be enhanced. On the other hand, when the magnet (permanent magnet) is increased, the magnetic force is increased, so that the torque of the motor can be increased. However, in the rotor having the conventional structure, since the magnets and the core pieces are alternately arranged in the circumferential direction, they cannot be enlarged at the same time. For this reason, in the axial gap motor having the conventional structure, it has been difficult to achieve high torque and high efficiency.

SUMMARY

One aspect of an exemplary motor of the present disclosure includes a rotor rotatable about a central axis as a rotation axis, and a stator located on one side in an axial direction of the rotor. The rotor includes a plurality of side magnets whose magnetization direction is a circumferential direction and that are arranged in the circumferential direction, and a plurality of core pieces arranged between the side magnets in the circumferential direction. The core piece includes a core piece main body that is in close contact with side surfaces of the side magnets on a pair of side surfaces facing both sides in the circumferential direction, and an extended tooth portion located on one axial side of the core piece main body. The extended tooth portion protrudes to one axial side with respect to a surface facing the one axial side of the side magnet, and has a larger width dimension in the circumferential direction than that of the core piece main body.

The above and other elements, features, steps, characteristics and advantages of the present disclosure will become more apparent from the following detailed description of the preferred embodiments with reference to the attached drawings.

DETAILED DESCRIPTION

Hereinafter, motors according to embodiments of the present disclosure will be described with reference to the accompanying drawings. Note that the scope of the present disclosure is not limited to the embodiments described below, but includes any modification thereof within the scope of the technical idea of the present disclosure. In each drawing, a Z-axis is illustrated as appropriate. The Z axis is a virtual axis parallel to a central axis J to be described later. The Z axis is a vertical direction in which a positive side is an "upper side" and a negative side is a "lower side". Note that the posture of the motor in the vertical direction in the present specification is an example for description, and does not limit the posture of the motor during use.

Figure 1:
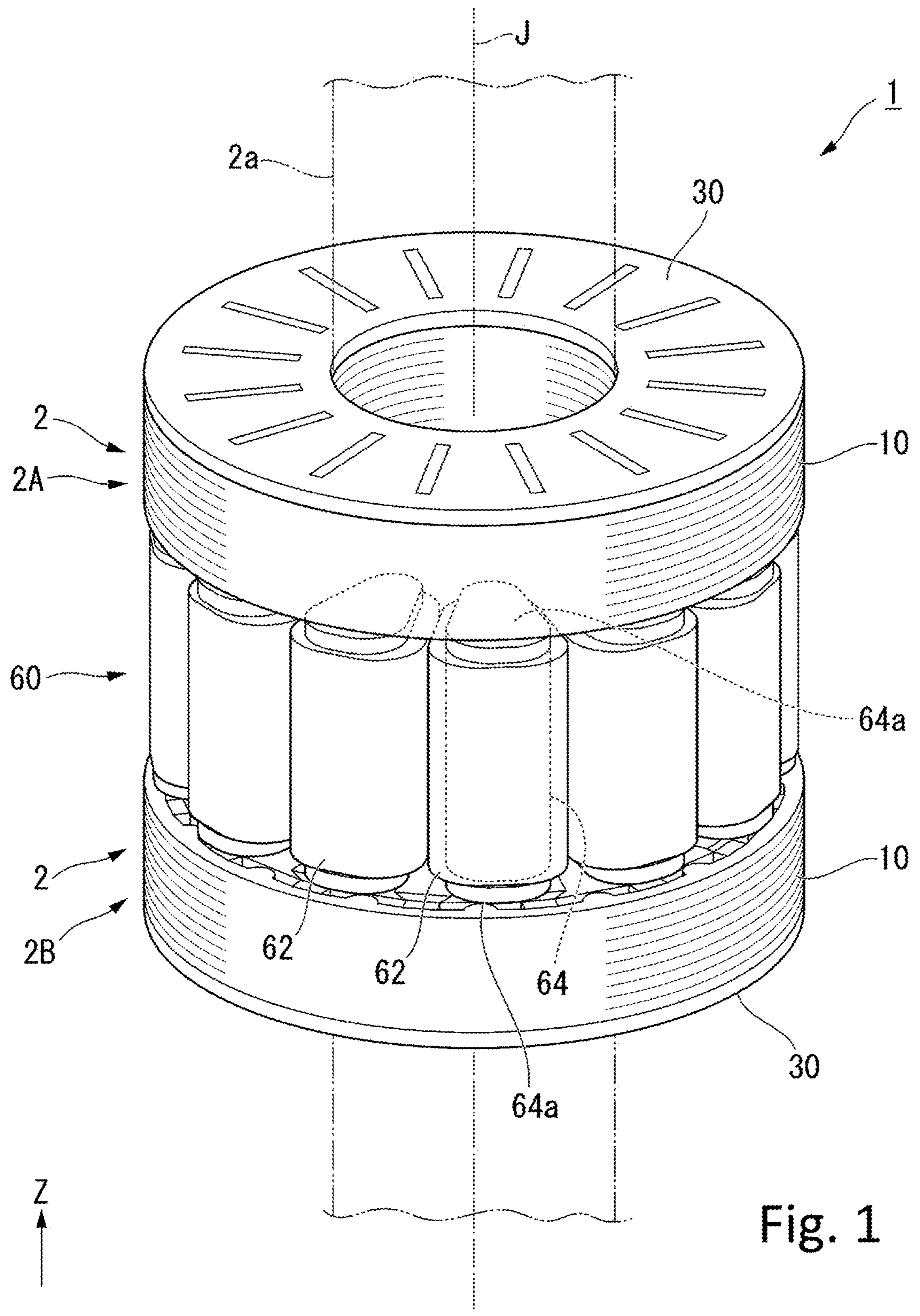
FIG. 1 is a perspective view of a motor of a first embodiment.

FIG. 1 is a perspective view of a motor 1 of a first embodiment.

The motor 1 includes a cylindrical rotation shaft 2*a* extending along the central axis J, a pair of rotors 2, and a stator 60 disposed between the pair of rotors 2. The motor 1 of the present embodiment is an axial gap type motor in which the rotor 2 and the stator 60 face each other with a gap interposed therebetween in the axial direction.

In the present specification, the central axis J is an imaginary line and extends in the vertical direction. In the following description, the axial direction of the central axis J may be simply referred to as an "axial direction", a direction corresponding to the lower side in the axial direction may be referred to as "one side in the axial direction", and a direction corresponding to the upper side may be referred to as "the other side in the axial direction". Further, a radial direction about the central axis J is simply referred to as a "radial direction", and a circumferential direction about the central axis J is simply referred to as a "circumferential direction".

The stator 60 is disposed between the pair of rotors 2 in the axial direction. The stator 60 is located below an upper rotor 2A and above a lower rotor 2B of the pair of rotors 2. The stator 60 has an annular shape surrounding the central axis J when viewed from the axial direction. A rotation shaft passes through a hole (not illustrated) provided at the center of the stator 60.

The stator 60 includes a plurality of core portions 64 and a plurality of coils 62. The stator 60 of the present embodiment includes twelve core portions 64 and twelve coils 62. That is, the stator 60 of the present embodiment has 12 slots.

The core portion 64 is made of a magnetic material. The core portion 64 extends in a columnar shape along the axial direction. The shape of the core portion 64 viewed from the axial direction is a fan shape in which a corner R is provided at a corner. The center of the fan shape of the core portion 64 is disposed on the central axis J. The plurality of core portions 64 are arranged at equal intervals in the circumferential direction. The core portion 64 is formed by, for example, laminating a plurality of electromagnetic steel sheets in the axial direction.

The core portion 64 has rotor facing surfaces 64*a* facing upward and downward. The rotor facing surfaces 64*a* facing upward of the plurality of core portions 64 are disposed on the same plane. Similarly, the rotor facing surfaces 64*a* facing downward of the plurality of core portions 64 are disposed on the same plane. The rotor facing surface 64*a* facing upward faces the upper rotor 2A of the pair of rotors 2. The rotor facing surface 64*a* facing downward faces the lower rotor 2B of the pair of rotors 2.

The coil 62 is wound around the core portion 64. Each coil 62 is wound around an axis parallel to the central axis J. The plurality of coils 62 are arranged along the circumferential direction. The end portion of the coil 62 is drawn out from the stator 60 and connected to the power supply device. As a result, a current flows through the coil 62. The coil 62 forms a magnetic pole in the axial direction in the core portion 64 when a current flows.

The rotor 2 is rotatable about the central axis J as a rotation axis. The rotor 2 has an annular shape surrounding the central axis J. The pair of rotors 2 are fixed to the outer peripheral surface of the rotation shaft 2*a*. The pair of rotors 2 are connected to each other via the rotation shaft 2*a*. Therefore, the pair of rotors 2 synchronously rotate about the central axis J. According to the present embodiment, by sandwiching the stator 60 between the pair of rotors 2 from both sides in the axial direction, it is possible to provide the motor 1 with high torque and high efficiency by effectively using the upper and lower magnetic fluxes of the stator 60.

The pair of rotors 2 is disposed to be inverted in the vertical direction. In the pair of rotors 2, magnetic poles facing the stator side are opposite to each other. That is, the magnetic pole of the lower rotor 2B disposed at a position overlapping the N pole of the upper rotor 2A is the S pole. Similarly, the magnetic pole of the lower rotor 2B disposed at a position overlapping the S pole of the upper rotor 2A is the N pole. The pair of rotors 2A and 2B have the same configuration except for these points. Hereinafter, the upper rotor 2A of the pair of rotors will be described as a representative, and the description of the lower rotor 2B will be omitted. In addition, in the following description, when simply referred to as a "rotor 2", it is assumed to mean the rotor 2A arranged on the upper side.

Figure 2:
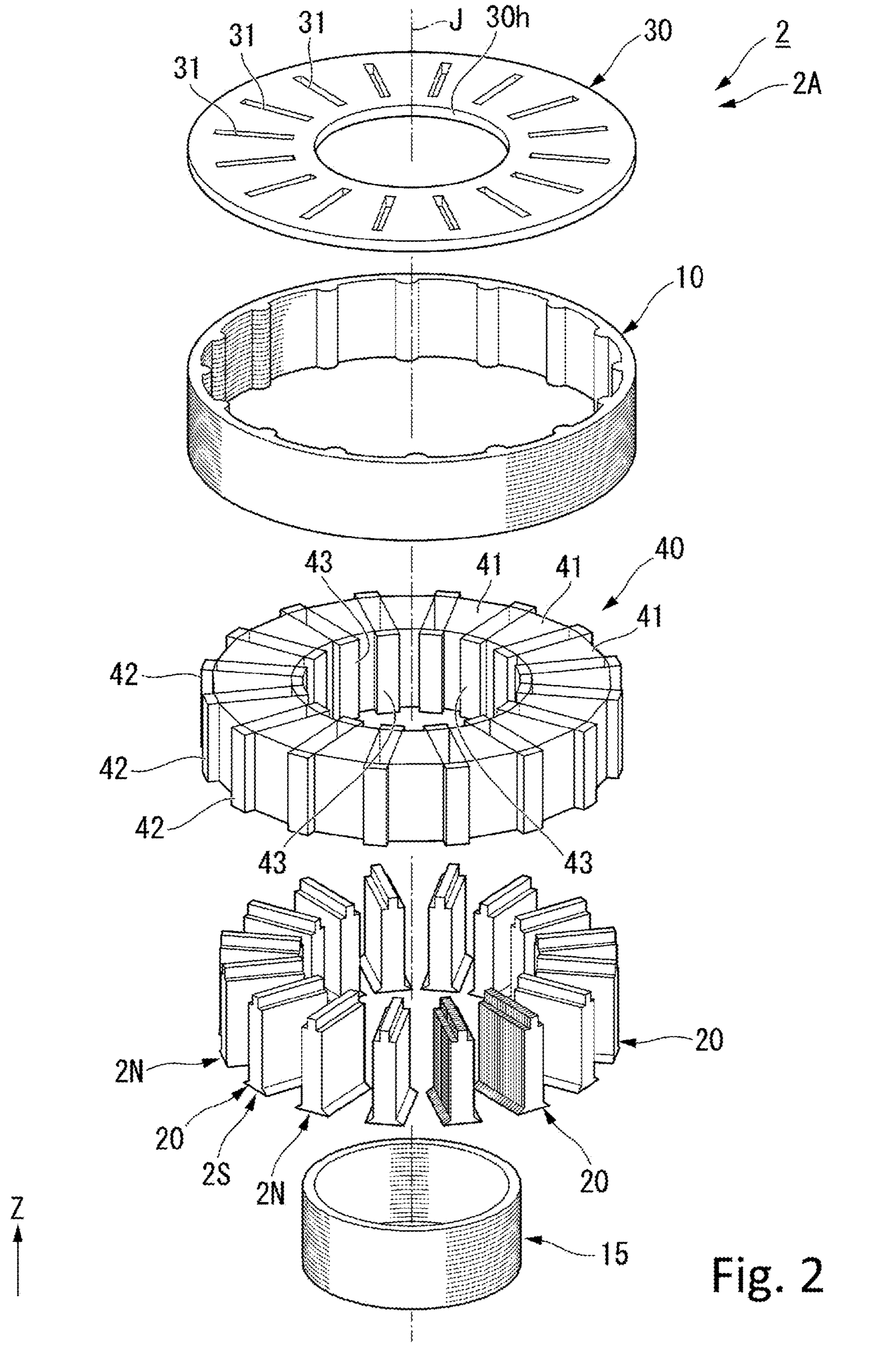
FIG. 2 is an exploded view of a rotor of the first embodiment.

FIG. 2 is an exploded view of the pair of rotors 2.

The rotor 2 includes a cover plate 30, an outer frame yoke 10, a magnet group 40, a plurality of core pieces 20, and an inner frame yoke 15. The magnet group 40 includes sixteen side magnets 41, sixteen outer magnets 42, and sixteen inner magnets 43. The side magnet 41, the outer magnet 42, and the inner magnet 43 are permanent magnets.

The plurality of core pieces 20 are arranged at equal intervals in the circumferential direction. Each core piece 20 extends along the radial direction when viewed from the axial direction. Therefore, the plurality of core pieces 20 are arranged radially when viewed from the axial direction. The rotor 2 of the present embodiment is provided with sixteen core pieces 20, thereby constituting sixteen magnetic poles 2N and 2S. That is, the rotor 2 of the present embodiment has sixteen poles. The directions of the magnetic poles 2N and 2S are parallel to the axial direction. The sixteen magnetic poles 2N and 2S are classified into eight N-poles 2N and eight S-poles 2S. The N-pole 2N and the S-pole 2S are alternately arranged in the circumferential direction.

Figure 3:
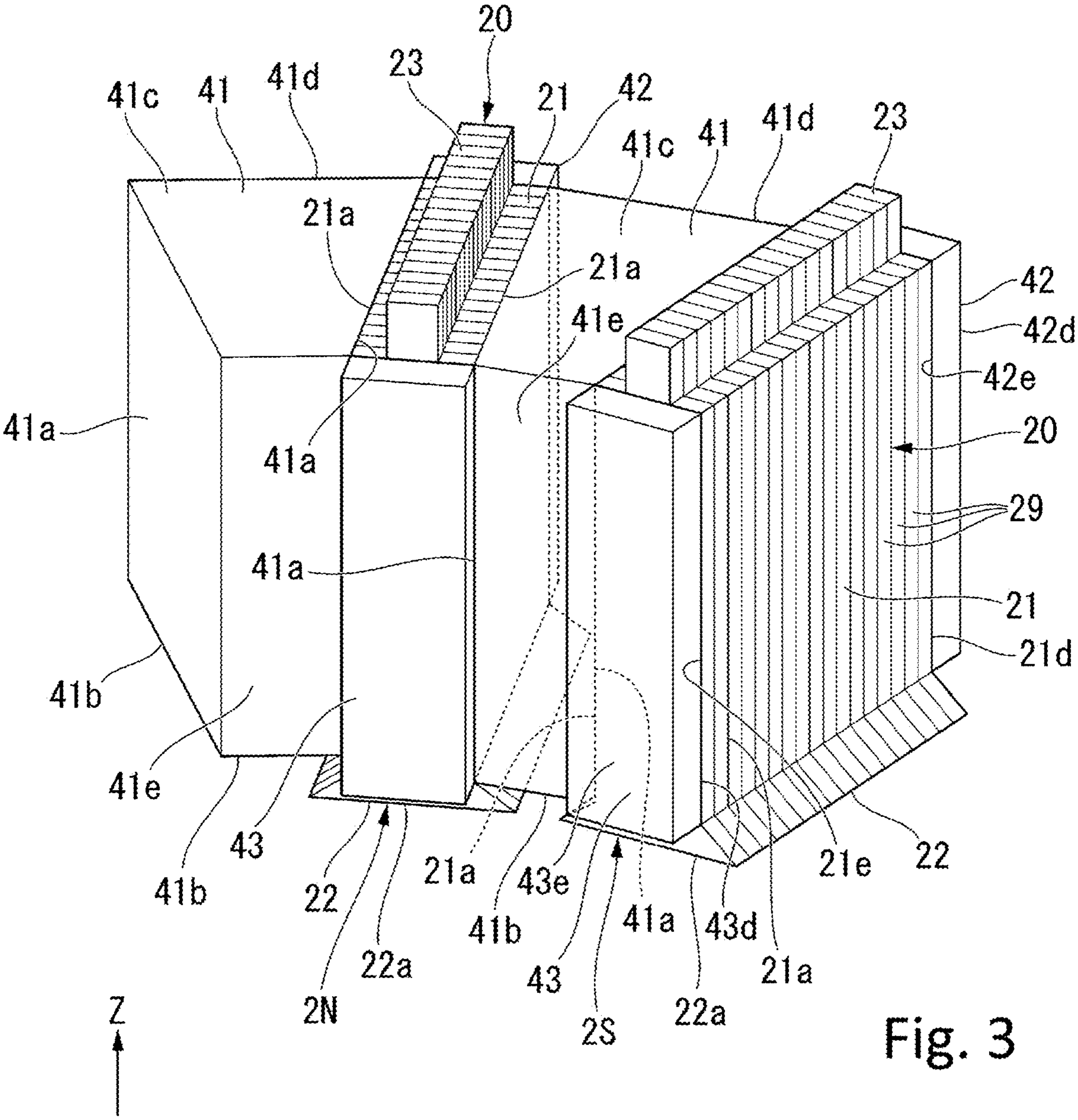
FIG. 3 is a perspective view illustrating each magnet and an inner magnet of the first embodiment.

FIG. 3 is a perspective view illustrating the core piece 20, the side magnet 41, the outer magnet 42, and the inner magnet 43.

The core piece 20 is a magnetic body. The core piece 20 includes a plurality of electromagnetic steel sheets (steel sheets) 29 stacked along the radial direction. The plurality of electromagnetic steel sheets 29 are fixed to each other by a caulking process. The plurality of electromagnetic steel sheets 29 may be bonded and fixed to each other.

In the core piece 20 of FIG. 3, the thickness of the electromagnetic steel sheet 29 and the number of sheets used are schematically different from the actual ones. The same applies to the other drawings.

The core piece 20 of the present embodiment has a uniform cross-sectional shape and extends in the radial direction. Therefore, the plurality of electromagnetic steel sheets 29 constituting the core piece 20 can all have the same shape. According to the present embodiment, as compared with the case of preparing a plurality of types of electromagnetic steel sheets, the number of types of dies for punching the electromagnetic steel sheets 29 can be reduced, and the cost of the motor 1 can be reduced. In addition, the cost required for component management and assembly management of the electromagnetic steel sheet 29 can be reduced as compared with the case of preparing a plurality of types of electromagnetic steel sheets.

The core piece 20 includes a core piece main body 21, an extended tooth portion 22, and a protrusion 23. The extended tooth portion 22 is located on the lower side (one side in the axial direction) of the core piece main body 21. On the other hand, the protrusion 23 is located on the upper side (the other side in the axial direction) of the core piece main body 21.

The core piece main body 21 has a rectangular parallelepiped shape extending in the radial direction and the axial direction. The core piece main body 21 has a pair of side surfaces 21*a* facing both sides in the circumferential direction, an outer surface 21*d* facing radially outside, and an inner surface 21*e* facing radially inside. The pair of side surfaces 21*a* are parallel to each other. The outer surface 21*d* and the inner surface 21*e* are parallel to each other. The core piece main body 21 is in close contact with a side surface 41*a* of the side magnet 41 at each of the pair of side surfaces 21*a*. The core piece main body 21 is in close contact with the outer magnet 42 at the outer surface 21*d*. The core piece main body 21 is in close contact with the inner magnet 43 at the inner surface 21*e*. The axial position of the lower end of the core piece main body 21 coincides with the lower surface 41*b* of the side magnet 41 or is positioned slightly lower than the lower surface 41*b*.

Since the core piece 20 of the present embodiment is formed by stacking a plurality of electromagnetic steel sheets 29 along the radial direction, it is excellent in magnetic characteristics and can be manufactured at low cost. However, even in a core piece formed by stacking electromagnetic steel sheets, when a side surface facing the side magnet is inclined with respect to the stacking direction of the electromagnetic steel sheets, a plurality of steps corresponding to the sheet thickness of the electromagnetic steel sheets are provided on the side surface. In this case, the core piece and the side magnet cannot closely adhere to each other. On the other hand, in the present embodiment, the pair of side surfaces 21*a* of the core piece 20 extends in parallel with the radial direction which is the stacking direction of the electromagnetic steel sheets 29. Therefore, the side surface 21*a* of the core piece 20 can be a flat surface, and dense close contact with the side magnet 41 can be realized.

The extended tooth portion 22 is connected to the lower end of the core piece main body 21. The extended tooth portion 22 has a trapezoidal shape when viewed from the radial direction. The extended tooth portion 22 has a uniform cross-sectional shape and extends along the radial direction. The position of the upper end of the extended tooth portion 22 in the axial direction coincides with the lower surface 41*b* of the side magnet 41 or is positioned slightly lower than the lower surface 41*b*. Therefore, the extended tooth portion 22 protrudes downward with respect to the lower surface 41*b* of the side magnet 41.

The width dimension in the circumferential direction of the extended tooth portion 22 continuously increases toward the lower side (one side in the axial direction). The width dimension in the circumferential direction of the upper end of the extended tooth portion 22 is equal to the width dimension in the circumferential direction of the lower end of the core piece main body 21. The width dimension in the circumferential direction of the extended tooth portion 22 is the largest at the lower end of the extended tooth portion 22. In the present specification, the "width dimension in the circumferential direction" means a linear distance between end portions in the circumferential direction in a direction orthogonal to the radial direction, and does not mean an arc length extending along the circumferential direction. In addition, in the present specification, when simply referred to as a "width dimension in the circumferential direction of the extended tooth portion 22", it means a width dimension at a portion having the largest width dimension in the circumferential direction (lower end in the present embodiment) in the extended tooth portion 22.

The extended tooth portion 22 has a stator facing surface 22*a* facing downward (one side in the axial direction). The stator facing surface 22*a* faces the stator 60 (see FIG. 1) in the axial direction. The stator facing surface 22*a* causes a magnetic flux to flow toward the stator 60. The stator facing surface 22*a* has a rectangular shape with the radial direction as the longitudinal direction. The width dimension in the circumferential direction of the stator facing surface 22*a* is larger than the width dimension in the circumferential direction of the lower end of the core piece main body 21.

The protrusion 23 is connected to the upper end of the core piece main body 21. The protrusion 23 protrudes upward (the other side in the axial direction) from the core piece main body 21. The protrusion 23 has a rectangular shape when viewed from the radial direction. The protrusion 23 has a uniform cross-sectional shape and extends along the radial direction. The protrusion 23 has a smaller width dimension in the circumferential direction than that of the core piece main body 21.

The side magnet 41 has a trapezoidal shape when viewed from the axial direction. The side magnet 41 has a columnar shape having a uniform cross-sectional shape and extending along the axial direction. The side magnet 41 has a pair of side surfaces 41*a* facing both sides in the circumferential direction, a lower surface 41*b* facing the lower side (one side in the axial direction), an upper surface 41*c* facing the upper side (the other side in the axial direction), an outer surface 41*d* facing radially outward, and an inner surface 41*e* facing radially inward. The pair of side surfaces 41*a* are continuously separated from each other toward radially outside. The upper surface 41*c* and the lower surface 41*b* are parallel to each other. The outer surface 41*d* and the inner surface 41*e* are parallel to each other.

Figure 4:
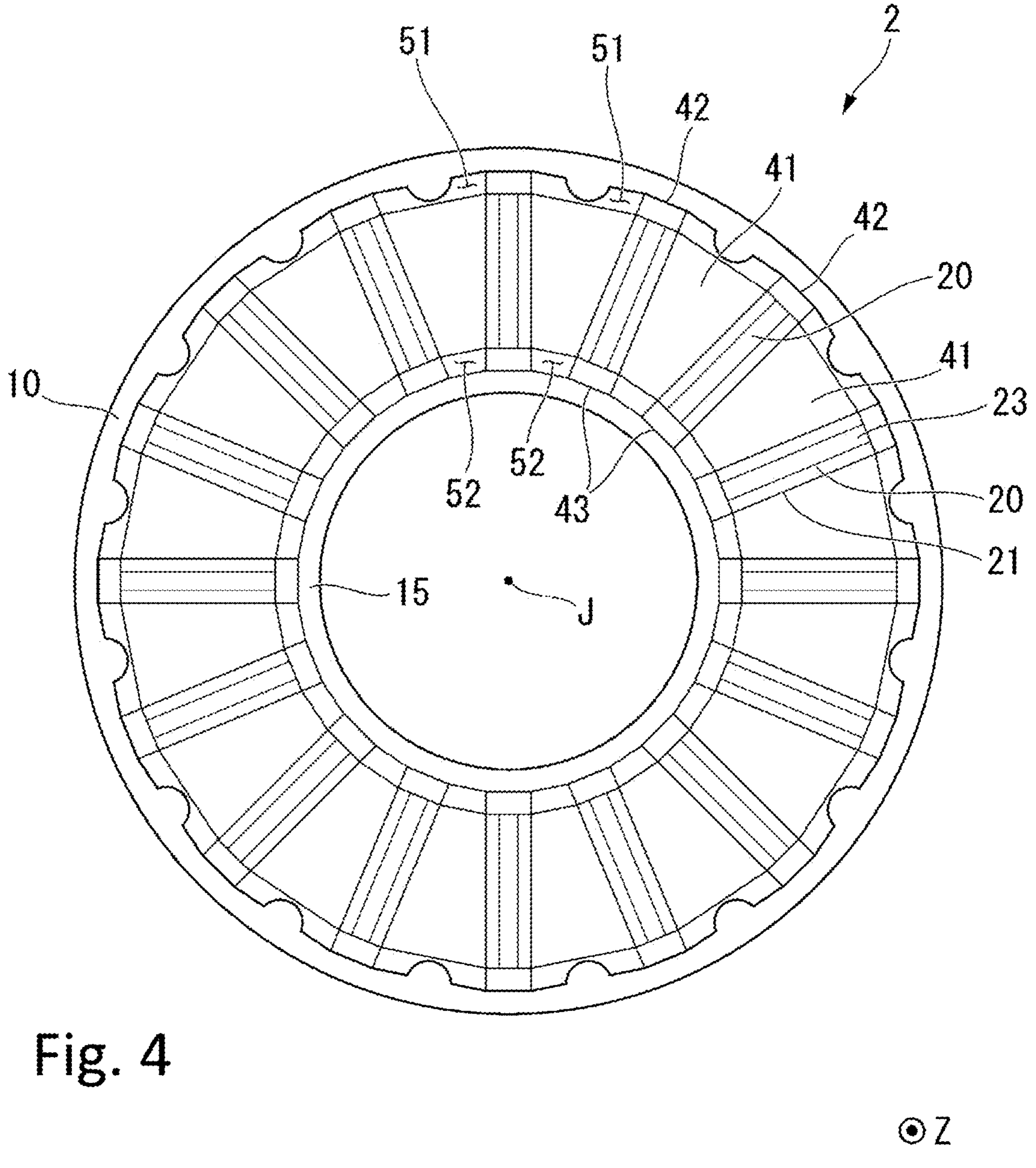
FIG. 4 is a plan view of the rotor of the first embodiment as viewed from above.
Figure 5:
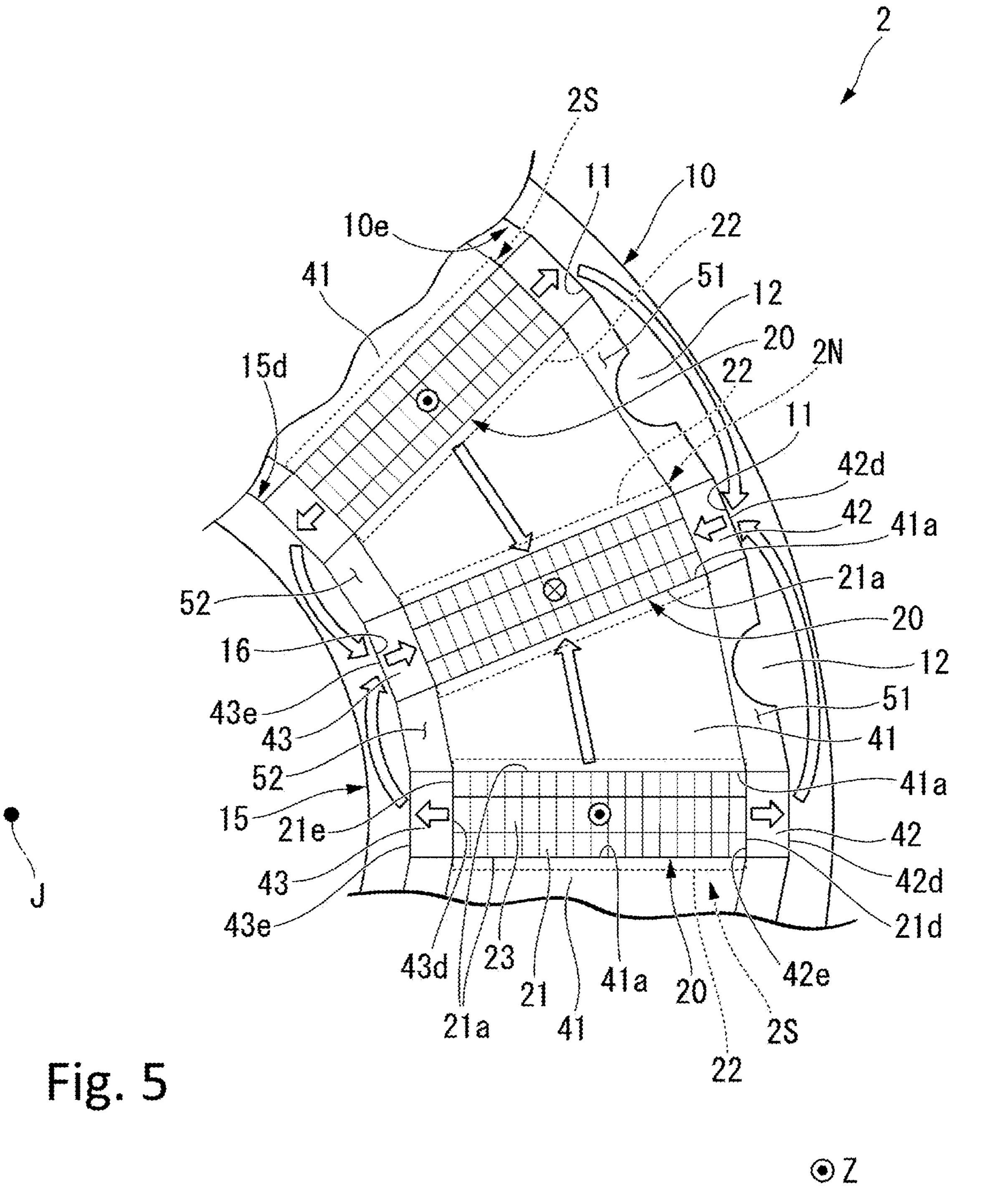
FIG. 5 is a partially enlarged view of FIG. 4.

FIG. 4 is a plan view of the rotor 2 as viewed from above. FIG. 5 is a partially enlarged view of FIG. 4. Note that illustration of the cover plate 30 is omitted in FIGS. 4 and 5. FIG. 5 schematically illustrates lines of magnetic force passing through the magnets 41, 42, and 43, the core piece 20, the outer frame yoke 10, and the inner frame yoke 15.

As illustrated in FIG. 5, the side magnet 41 is magnetized in the circumferential direction. In the plurality of side magnets 41, those magnetized from one side to the other side in the circumferential direction and those magnetized from one side to the other side in the circumferential direction are alternately arranged in the circumferential direction.

The plurality of side magnets 41 are arranged at equal intervals in the circumferential direction. The core piece 20 is disposed between the pair of side magnets 41 arranged in the circumferential direction. The side surface 41*a* of the side magnet 41 is in close contact with the side surface 21*a* of the core piece main body 21. In the present embodiment, an adhesive layer is provided between the side surfaces 41*a* and 21*a* of the side magnet 41 and the core piece main body 21, and the side surfaces 41*a* and 21*a* are fixed to each other. In the present specification, "in close contact" means that the surfaces face each other and contact each other with their normal lines coinciding with each other. In addition, in the present specification, the term "in close contact" is understood to include a case where surfaces are in contact with each other via an adhesive layer.

As illustrated in FIG. 3, the outer magnet 42 is a rectangular parallelepiped. The width dimension in the circumferential direction of the outer magnet 42 is substantially equal to the width dimension in the circumferential direction of the core piece main body 21. The outer magnet 42 has an outer surface 42*d* facing radially outward and an inner surface 42*e* facing radially inward. The outer surface 42*d* and the inner surface 42*e* are parallel to each other.

As illustrated in FIG. 5, the outer magnet 42 is magnetized in the radial direction. In the plurality of outer magnets 42, those magnetized from the radially outer side to the inner side and those magnetized from the circumferentially inner side to the outer side are alternately arranged in the circumferential direction.

The outer magnet 42 is disposed between the core piece 20 and the outer frame yoke 10 in the radial direction. The outer magnet 42 is in close contact with the outer surface 21*d* of the core piece main body 21 on the inner surface 42*e*. The outer magnet 42 is in close contact with the inner surface 10*e* of the outer frame yoke 10 on the outer surface 42*d*. In the present embodiment, an adhesive layer is provided between the outer magnet 42 and the core piece main body 21, and the inner surface 42*e* and the outer surface 21*d* are fixed to each other. Similarly, an adhesive layer is provided between the outer magnet 42 and the outer frame yoke 10, and the outer surface 42*d* and the inner surface 10*e* are fixed to each other.

As illustrated in FIG. 3, the inner magnet 43 is a rectangular parallelepiped. In the present embodiment, the inner magnet 43 has the same shape as that of the outer magnet 42. The width dimension in the circumferential direction of the inner magnet 43 is substantially equal to the width dimension in the circumferential direction of the core piece main body 21. The inner magnet 43 has an outer surface 43*d* facing radially outward and an inner surface 43*e* facing radially inward. The outer surface 43*d* and the inner surface 43*e* are parallel to each other.

As illustrated in FIG. 5, the inner magnet 43 is magnetized in the radial direction. In the plurality of inner magnets 43, those magnetized from the radially outer side to the inner side and those magnetized from the circumferentially inner side to the outer side are alternately arranged in the circumferential direction. In addition, with respect to one core piece main body, the magnetization directions of the outer magnet 42 and the inner magnet 43 disposed inside and outside in the radial direction are opposite to each other in the radial direction.

The inner magnet 43 is disposed between the core piece 20 and the inner frame yoke 15 in the radial direction. The inner magnet 43 is in close contact with the inner surface 21*e* of the core piece main body 21 on the outer surface 43*d*. The inner magnet 43 is in close contact with the outer surface 15*d* of the inner frame yoke 15 on the inner surface 43*e*. In the present embodiment, an adhesive layer is provided between the inner magnet 43 and the core piece main body 21, and the outer surface 43*d* and the inner surface 21*e* are fixed to each other. Similarly, an adhesive layer is provided between the inner magnet 43 and the inner frame yoke 15, and the inner surface 43*e* and the outer surface 15*d* are fixed to each other.

The pair of side magnets 41, the outer magnet 42, and the inner magnet 43 are in contact with one core piece 20. In the pair of side magnets 41, the outer magnet 42, and the inner magnet 43 that are in contact with one core piece 20, the poles on the side to be in contact with the core piece 20 coincide with each other. The pair of side magnets 41 in contact with the core piece 20 constituting the N magnetic pole 2N is disposed such that the side surface 41*a* in contact with the core piece 20 is the N pole. The outer magnet 42 in contact with the core piece 20 constituting the N magnetic pole 2N is disposed such that the inner surface 42*e* in contact with the core piece 20 is the N-pole. The inner magnet 43 in contact with the core piece 20 constituting the N magnetic pole 2N is disposed such that the outer surface 43*d* in contact with the core piece 20 is the N-pole. The magnetic flux entering the inside of the core piece 20 bends downward inside the core piece 20 and flows from the extended tooth portion 22 toward the stator 60 side. As will be described later, a cover plate 30 made of a non-magnetic material is disposed on the upper side of the core piece 20. Therefore, in the core piece 20, the magnetic flux hardly flows upward.

The outer frame yoke 10 has an annular shape surrounding the central axis J. The outer frame yoke 10 has a uniform shape and extends along the axial direction. The outer frame yoke 10 is a magnetic body. The outer frame yoke 10 is made of a plurality of electromagnetic steel sheets stacked along the axial direction.

The outer frame yoke 10 has an inner surface 10*e* facing radially inward. The inner surface 10*e* is provided with a plurality of inner surface protrusions 12 and a plurality of first flat portions 11. The inner surface protrusions 12 and the first flat portions 11 are alternately arranged along the circumferential direction on the inner surface 10*e*.

The inner surface protrusion 12 protrudes radially inward from the inner surface 10*e*. The tip end surface of the inner surface protrusion 12 has a semicircular shape when viewed from the axial direction. The inner surface protrusion 12 is disposed radially outside the side magnet 41. A gap is provided between the inner surface protrusion 12 and the side magnet 41. According to the outer frame yoke 10 of the present embodiment, the radial thickness dimension increases in the portion where the inner surface protrusion 12 is provided. As a result, the outer frame yoke 10 is reinforced, and the strength and rigidity of the outer frame yoke 10 are enhanced.

The first flat portion 11 faces radially inward and is orthogonal to the radial direction. One first flat portion 11 is in close contact with the outer surface 42*d* of one outer magnet 42. The outer frame yoke 10 is in close contact with the plurality of outer magnets 42 at the plurality of first flat portions 11 of the inner surface 10*e*. As described above, the magnetization directions of the two outer magnets 42 adjacent in the circumferential direction are reversed in the radial direction. Therefore, the magnetic path connecting the outer magnets 42 adjacent in the circumferential direction passes through the outer frame yoke 10.

A first flux barrier portion 51 is provided between the outer frame yoke 10 and the side magnet 41. The first flux barrier portion 51 is located between two outer magnets 42 adjacent to each other in the circumferential direction. That is, the first flux barrier portion 51 is a space surrounded by the side magnet 41, the outer frame yoke 10, and the pair of outer magnets 42. Although the first flux barrier portion 51 of the present embodiment is a void portion, the first flux barrier portion 51 may be filled with a non-magnetic portion such as resin. In the first flux barrier portion 51, the flow of magnetic flux is restricted. By providing the first flux barrier portion 51, magnetic flux leakage from the side magnet 41 and the outer magnet 42 can be reduced.

The inner frame yoke 15 has an annular shape surrounding the central axis J. The inner frame yoke 15 has a uniform shape and extends along the axial direction. The inner frame yoke 15 is a magnetic body. The inner frame yoke 15 is formed of a plurality of electromagnetic steel sheets stacked along the axial direction.

The inner frame yoke 15 has the outer surface 15*d* facing radially outward. The outer surface 15*d* is provided with a plurality of second flat portions 16. The plurality of second flat portions 16 are arranged at equal intervals on the outer surface 15*d*. The second flat portion 16 faces radially outward and is orthogonal to the radial direction. One second flat portion 16 is in close contact with the inner surface 43*e* of one inner magnet 43. That is, the inner frame yoke 15 is in close contact with the plurality of inner magnets 43 at the plurality of second flat portions 16 of the outer surface 15*d*. As described above, the magnetization directions of the two inner magnets 43 adjacent to each other in the circumferential direction are reversed in the radial direction. The magnetic path connecting the inner magnets 43 adjacent to each other in the circumferential direction passes through the inner frame yoke 15.

A second flux barrier portion 52 is provided between the inner frame yoke 15 and the side magnet 41. The second flux barrier portion 52 is located between two inner magnets 43 adjacent to each other in the circumferential direction. That is, the second flux barrier portion 52 is a space surrounded by the side magnet 41, the inner frame yoke 15, and the pair of inner magnets 43. The second flux barrier portion 52 of the present embodiment is a void portion, but may be filled with a non-magnetic portion such as resin. By providing the second flux barrier portion 52, magnetic flux leakage from the side magnet 41 and the inner magnet 43 can be reduced.

As illustrated in FIG. 2, the cover plate 30 has a plate shape orthogonal to the central axis J. The cover plate 30 has an annular shape surrounding the central axis J. The outer shape of the cover plate 30 is circular when viewed from the axial direction. The center of the outer shape of the cover plate 30 is located on the central axis J. The cover plate 30 is provided with a central hole 30*h* penetrating in the axial direction. The central hole 30*h* is circular when viewed from the axial direction. The center of the central hole 30*h* is located on the central axis J.

The cover plate 30 is provided with a plurality of slots 31. The slot 31 penetrates the cover plate 30 in the axial direction. The slot 31 has a rectangular shape whose longitudinal direction is the radial direction. The plurality of slots 31 are arranged at equal intervals along the circumferential direction. The number of slots 31 provided in the cover plate 30 is equal to the number of core pieces 20. That is, the cover plate 30 of the present embodiment is provided with sixteen slots 31.

The cover plate 30 is made of a non-magnetic material. Examples of the material constituting the cover plate 30 include a metal material such as an aluminum alloy or an austenitic stainless alloy.

The cover plate 30 is located on the upper side (the other side in the axial direction) of the outer frame yoke 10, the magnet group 40, the plurality of core pieces 20, and the inner frame yoke 15. The outer diameter of the cover plate 30 is substantially the same as or slightly larger than the outer diameter of the outer frame yoke 10. The inner diameter of the cover plate 30 (that is, the diameter of the central hole 30*h*) is substantially the same as or slightly smaller than the inner diameter of the inner frame yoke 15. Therefore, the outer frame yoke 10, the magnet group 40, the plurality of core pieces 20, and the inner frame yoke 15 are disposed to overlap the cover plate 30 when viewed from the axial direction. The cover plate 30 covers the upper surfaces (end surfaces on the other side in the axial direction) of the outer frame yoke 10, the plurality of side magnets 41, the plurality of outer magnets 42, the plurality of inner magnets 43, the plurality of core pieces 20, and the inner frame yoke 15. The cover plate 30 suppresses leakage of magnetic flux upward from the outer frame yoke 10, the plurality of side magnets 41, the plurality of outer magnets 42, the plurality of inner magnets 43, the plurality of core piece main bodies 21, and the inner frame yoke 15. A part (protrusion 23) of the core piece 20 is exposed upward from the slot 31 of the cover plate 30.

Figure 6:
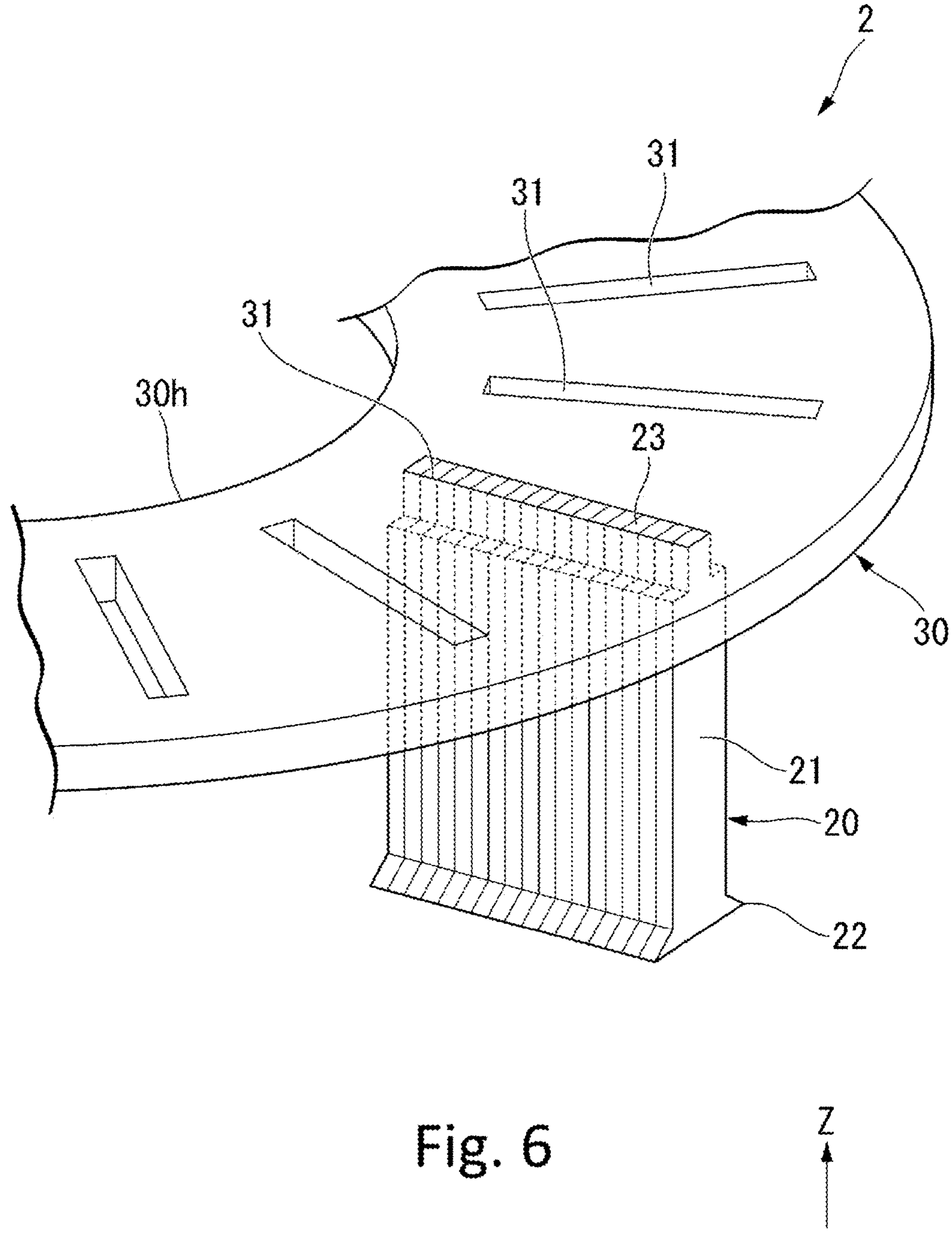
FIG. 6 is a perspective view of a cover plate of the first embodiment.

FIG. 6 is a perspective view of the cover plate 30.

As illustrated in FIG. 6, the protrusion 23 of the core piece 20 is inserted into the slot 31. The lower surface of the cover plate 30 is in contact with the upper end surface of the core piece main body 21. Accordingly, the plurality of core pieces 20 are positioned with respect to the cover plate 30.

The cover plate 30 and the core piece 20 are preferably bonded and fixed to each other. An adhesive may be disposed between the inner surface of the slot 31 and the outer surface of the protrusion 23, or may be disposed between the lower surface of the cover plate 30 and the upper end surface of the core piece main body 21. Further, the cover plate 30 may be bonded and fixed to the outer frame yoke 10, the plurality of side magnets 41, the plurality of outer magnets 42, the plurality of inner magnets 43, and the inner frame yoke 15.

As illustrated in FIG. 3, the core piece 20 of the present embodiment is sandwiched from both sides in the circumferential direction by a pair of side magnets 41 whose magnetization direction is the circumferential direction. The core piece 20 can concentrate the magnetic flux of the pair of side magnets 41 to flow toward the stator 60. According to the present embodiment, the magnetic force of the magnetic poles 2N and 2S of the rotor 2 can be increased, and the torque of the motor 1 can be increased.

The core piece 20 of the present embodiment has the extended tooth portion 22 protruding downward from the lower surface 41*b* of the side magnet and extending in the width direction from the core piece main body 21. According to the present embodiment, in the rotor 2, the width dimension in the circumferential direction of the stator facing surface 22*a* of the core piece 20 can be increased without reducing the width dimension in the circumferential direction of the side magnet 41. That is, the rotor 2 can cause a magnetic flux to flow toward the stator 60 in a wide range in the circumferential direction from each of the magnetic poles 2N and 2S without reducing the magnetic force of the side magnet 41. Occurrence of magnetic saturation on the stator facing surface 22*a* of the core piece 20 can be suppressed, and the high-density magnetic flux generated from the pair of side magnets 41 can be effectively used, and the motor 1 with high torque and high efficiency can be provided.

In the extended tooth portion 22 of the present embodiment, the width dimension in the circumferential direction is continuously increased toward the lower side (that is, the stator 60 side). According to the present embodiment, the extended tooth portion 22 can have a shape along the flow of the magnetic flux that enters the extended tooth portion 22 from the core piece main body 21 and flows from the stator facing surface 22*a* toward the stator 60. Therefore, the magnetic flux can smoothly flow from the extended tooth portion 22 toward the stator 60 without unnecessarily enlarging the extended tooth portion 22.

As illustrated in FIG. 5, the rotor 2 of the present embodiment includes the outer magnet 42 that is in close contact with the outer surface 21*d* of the core piece 20. The outer magnet 42 is magnetized in the radial direction. Therefore, the magnetic flux generated from the outer magnet 42 enters the core piece 20 and flows from the stator facing surface 22*a* toward the stator 60 side. That is, according to the present embodiment, the magnetic force of the magnetic poles 2N and 2S can be increased by the outer magnet 42. In addition, since the outer magnet 42 covers the outer surface 21*d* of the core piece 20, the magnetic flux generated from the pair of side magnets 41 and passing through the core piece 20 is suppressed from leaking radially outward from the outer surface 21*d* of the core piece 20. As a result, a magnetic flux having higher density can flow from the stator facing surface 22*a* of the core piece 20 toward the stator 60.

The rotor 2 of the present embodiment includes the annular outer frame yoke 10 that is in close contact with the outer surfaces 42*d* of the plurality of outer magnets 42. The outer frame yoke 10 appropriately guides the flow of the magnetic flux between the plurality of outer magnets 42 arranged in the circumferential direction, on the radially outer side of the outer magnet 42. As a result, the magnetic flux of the outer magnet 42 can be efficiently used, which can contribute to high torque and high efficiency of the motor 1.

The rotor 2 of the present embodiment includes the inner magnet 43 that is in close contact with the inner surface 21*e* of the core piece 20. The inner magnet 43 is magnetized in the radial direction. Therefore, the magnetic flux generated from the inner magnet 43 enters the core piece 20 and flows from the stator facing surface 22*a* toward the stator 60 side. That is, according to the present embodiment, the magnetic force of the magnetic poles 2N and 2S can be increased by the inner magnet 43. In addition, since the inner magnet 43 covers the inner surface 21*e* of the core piece 20, the inner magnet 43 also suppresses the magnetic flux generated from the pair of side magnets 41 and passing through the core piece 20 from leaking radially outward from the inner surface 21e of the core piece 20. As a result, a magnetic flux having higher density can flow from the stator facing surface 22a of the core piece 20 toward the stator 60.

The rotor 2 of the present embodiment includes the annular inner frame yoke 15 that is in close contact with the inner surfaces 43e of the plurality of inner magnets 43. The inner frame yoke 15 appropriately guides the flow of the magnetic flux between the plurality of inner magnets 43 arranged in the circumferential direction. As a result, the magnetic flux of the inner magnet 43 can be efficiently used, which can contribute to high torque and high efficiency of the motor 1.

Figure 7:
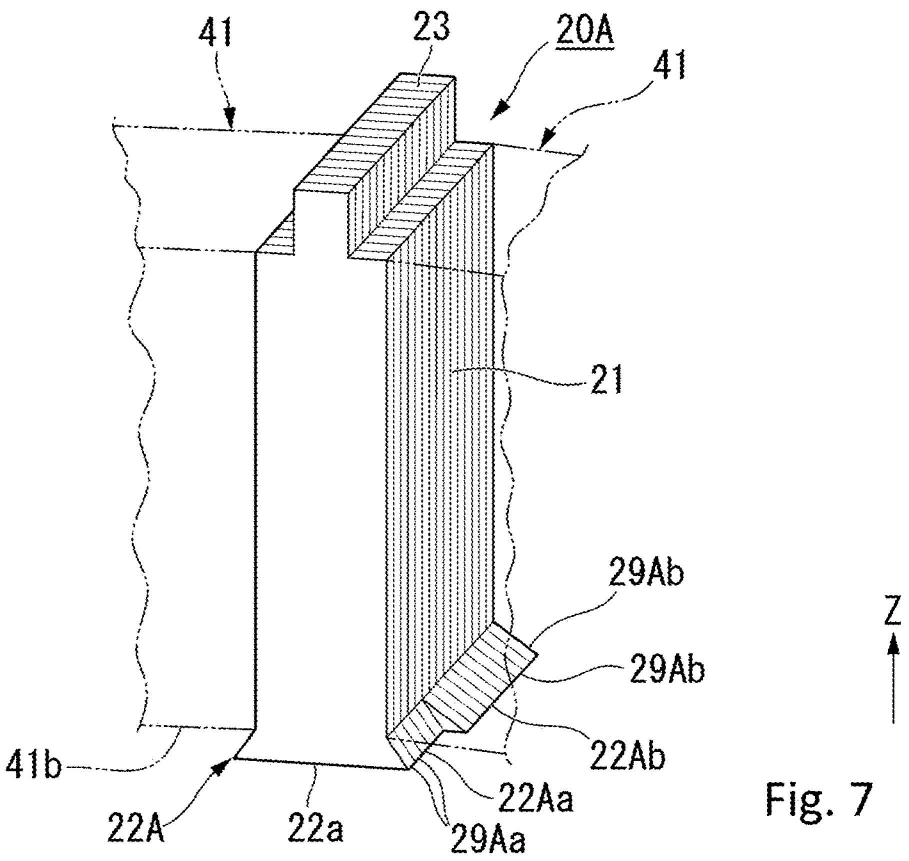
FIG. 7 is a perspective view of a core piece of Modification 1 that can be employed in the first embodiment.
Figure 8:
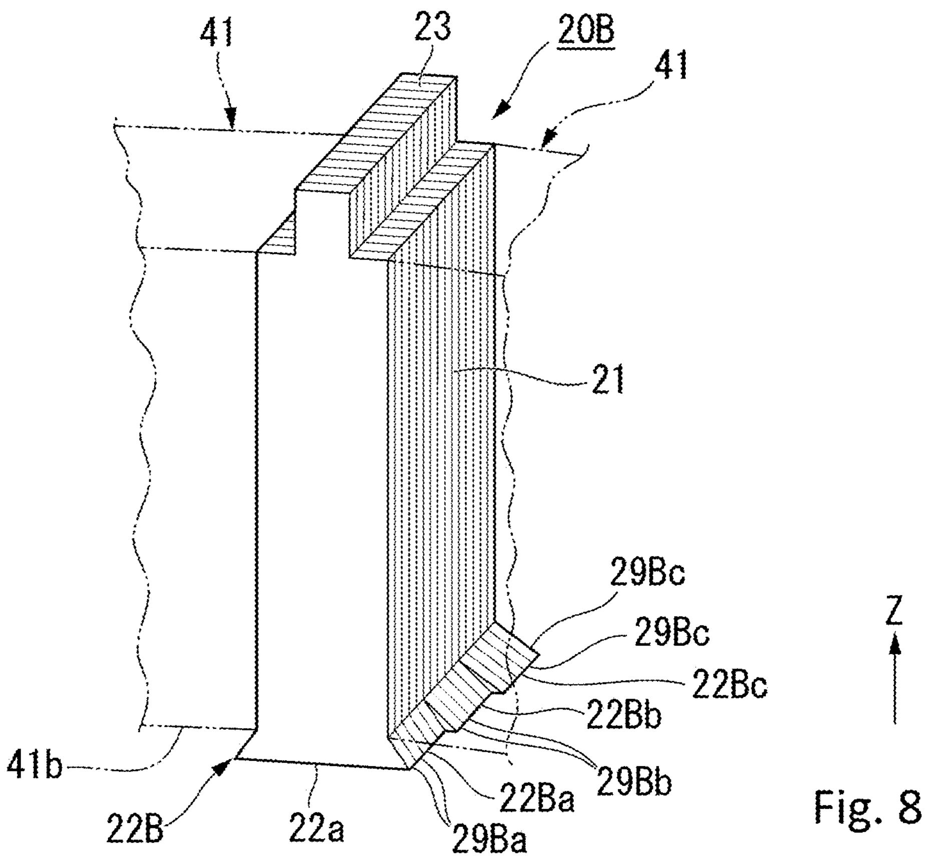
FIG. 8 is a perspective view of a core piece of Modification 2 that can be employed in the first embodiment.

FIG. 7 is a perspective view of a core piece 20A of Modification 1. FIG. 8 is a perspective view of a core piece 20B of Modification 2.

Hereinafter, the core pieces 20A and 20B of Modification 1 and Modification 2 which can be adopted in the first embodiment will be described. Note that members or portions that have their equivalents in the above-described embodiment are denoted by the same reference numerals as those of their equivalents in the above-described embodiment, and descriptions of those members or portions are omitted.

The core pieces 20A and 20B of Modification 1 and Modification 2 are different from those of the above-described embodiment in the configurations of extended tooth portions 22A and 22B. The extended tooth portions 22A and 22B of Modification 1 and Modification 2 protrude downward with respect to the lower surface 41b of the side magnet similarly to the above-described embodiment, and have a larger width dimension in the circumferential direction than that of the core piece main body 21. In the extended tooth portions 22A and 22B of Modification 1 and Modification 2, the width dimension in the circumferential direction of the extended tooth portions 22A and 22B is increased stepwise toward the radially outer side.

As illustrated in FIG. 7, the extended tooth portion 22A of Modification 1 includes a first portion 22Aa and a second portion 22Ab. The second portion 22Ab is located radially outside with respect to the first portion 22Aa. The width dimension in the circumferential direction of the second portion 22Ab is larger than the width dimension in the circumferential direction of the first portion 22Aa.

The core piece 20A of Modification 1 is configured by stacking two types of electromagnetic steel sheets (steel sheets) 29Aa and 29Ab in the radial direction. In the two types of electromagnetic steel sheets 29Aa and 29Ab, the width dimension of the extended tooth portion 22A is different from each other. One electromagnetic steel sheet 29Aa constitutes the first portion 22Aa, and the other electromagnetic steel sheet 29Ab constitutes the second portion 22Ab. In the electromagnetic steel sheet 29Ab constituting the second portion 22Ab, the width dimension of the extended tooth portion 22A is larger than that of the electromagnetic steel sheet 29Aa constituting the first portion 22Aa, and the other portions have the same shape.

As illustrated in FIG. 8, the extended tooth portion 22B of Modification 2 includes a first portion 22Ba, a second portion 22Bb, and a third portion 22Bc. The second portion 22Bb is located radially outside with respect to the first portion 22Ba. The width dimension in the circumferential direction of the second portion 22Bb is larger than the width dimension in the circumferential direction of the first portion 22Ba. The third portion 22Bc is located radially outside with respect to the second portion 22Bb. The width dimension in the circumferential direction of the third portion 22Bc is larger than the width dimension in the circumferential direction of the second portion 22Bb.

The core piece 20B of Modification 2 is configured by stacking three types of electromagnetic steel sheets (steel sheets) 29Ba, 29Bb, and 29Bc in the radial direction. In the three types of electromagnetic steel sheets 29Ba, 29Bb, and 29Bc, the width dimension of the extended tooth portion 22B is different from each other. One electromagnetic steel sheet 29Ba constitutes the first portion 22Ba, another electromagnetic steel sheet 29Bb constitutes the second portion 22Bb, and the remaining one electromagnetic steel sheet 29Bc constitutes the third portion 22Bc. In the electromagnetic steel sheet 29Bb constituting the second portion 22Bb, the width dimension of the extended tooth portion 22B is larger than that of the electromagnetic steel sheet 29Ba constituting the first portion 22Ba, and the other portions have the same shape. In the electromagnetic steel sheet 29Bc constituting the third portion 22Bc, the width dimension of the extended tooth portion 22B is larger than that of the electromagnetic steel sheet 29Bb constituting the second portion 22Bb, and the other portions have the same shape.

As illustrated in FIG. 1, the rotor facing surface 64a of the stator 60 has a fan shape whose circumferential dimension increases toward the radially outer side. According to the core pieces 20A and 20B of Modification 1 and Modification 2, the shape of the stator facing surface 22a can be increased in the circumferential direction on the radially outer side in accordance with the rotor facing surface 64a of the core portion 64 of the stator 60. As a result, the stator facing surface 22a can receive a force in a wide area from the core portion 64 of the stator 60 when the rotor 2 rotates, and the torque of the motor 1 can be increased.

According to Modification 1 and Modification 2, the plurality of electromagnetic steel sheets constituting the core pieces 20A and 20B respectively include a plurality of types of steel sheets having different width dimension in the circumferential directions of the extended tooth portions 22A and 22B. As a result, the core pieces 20A and 20B in which the width dimension in the circumferential directions of the extended tooth portions 22A and 22B change stepwise along the radial direction can be configured at low cost.

Figure 9:
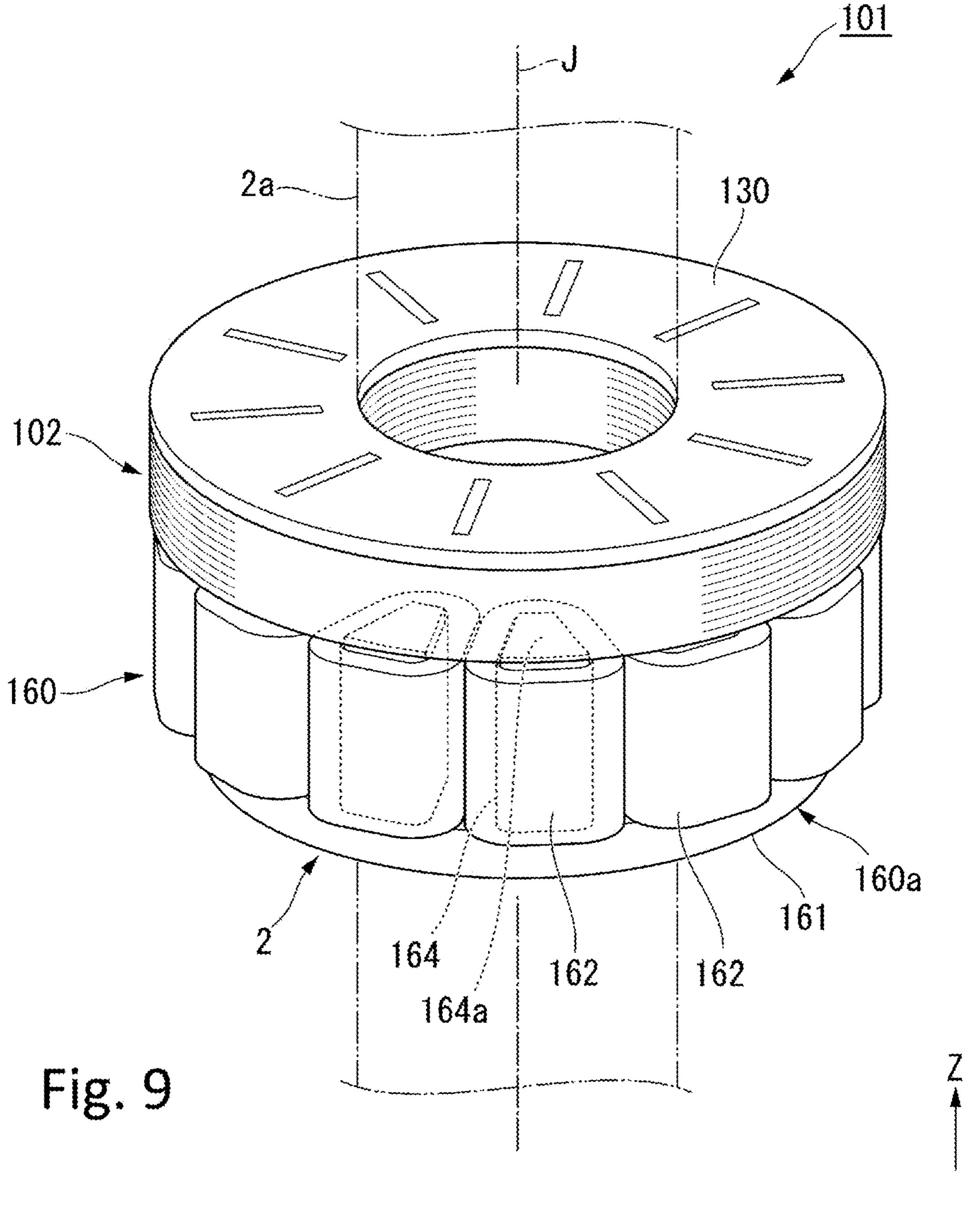
FIG. 9 is a perspective view of a motor of a second embodiment.

FIG. 9 is a perspective view of a motor 101 according to a second embodiment.

The motor 101 of the second embodiment is different from that of the first embodiment in the number of rotors 102 provided. The motor 101 of the second embodiment is also different from that of the first embodiment in the number of poles. Furthermore, the motor 101 of the second embodiment is different in that the configuration of Modification 2 described above is adopted as the configuration of the extended tooth portion 122 of the core piece 120.

The motor 101 of the present embodiment includes a cylindrical rotation shaft 2a extending along the central axis J, one rotor 102, and one stator 160 disposed on the lower side (one side in the axial direction) of the rotor 102.

The stator 160 includes a stator core 160a made of a magnetic body and a plurality of coils 162. The stator core 160a includes an annular back yoke 161 surrounding the central axis J, and a plurality of core portions 164 protruding upward from the upper surface of the back yoke 161. The stator 160 of the present embodiment includes twelve core portions 164 and twelve coils 162. The coil 162 is wound around the core portion 164. That is, the stator 160 of the present embodiment has twelve slots.

The core portion 164 extends in a columnar shape along the axial direction. The core portion 164 has a rotor facing surface 164a facing upward (that is, the rotor 102 side). The shape of the core portion 164 viewed from the axial direction is an isosceles trapezoidal shape in which a corner R is provided at a corner portion. In the core portion 164, among two sides parallel to each other when viewed from the axial direction, a short side is arranged on the radially inner side and a long side is arranged on the radially outer side, and two sides having the same length connecting them are arranged along the radial direction. The plurality of core portions 164 are arranged at equal intervals in the circumferential direction.

Figure 10:
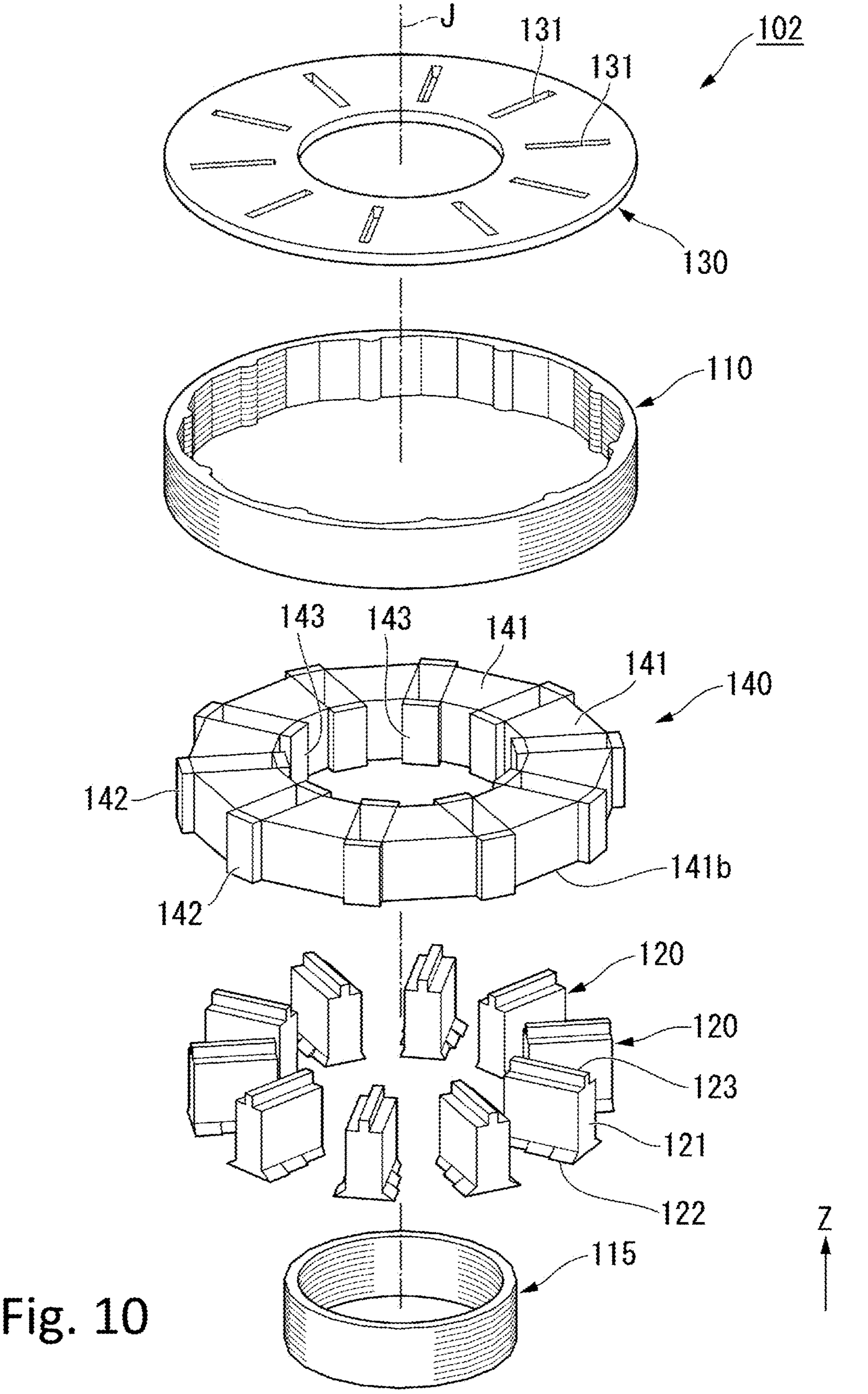
FIG. 10 is an exploded view of a rotor of the second embodiment.

FIG. 10 is an exploded view of the rotor 102. The rotor 102 includes a cover plate 130, an outer frame yoke 110, a magnet group 140, a plurality of core pieces 120, and an inner frame yoke 115. The magnet group 140 includes ten side magnets 141, ten outer magnets 142, and ten inner magnets 143. The pair of side magnets 141, the outer magnet 142, and the inner magnet 143 are in contact with one core piece 120 similarly to the above-described embodiment.

The outer frame yoke 110 and the inner frame yoke 115 have an annular shape surrounding the central axis J similarly to the above-described embodiment. The inner frame yoke 115 is disposed radially inside the outer frame yoke 110. Similarly to the above-described embodiment, the magnet group 140 and the plurality of core pieces 120 are disposed between the inner frame yoke 115 and the outer frame yoke 110 in the radial direction. The outer frame yoke 110 is in close contact with the plurality of outer magnets 142 from the radially outer side. The inner frame yoke 115 is in close contact with the plurality of inner magnets 143 from the radially inner side.

Similarly to the above-described embodiment, the cover plate 130 covers the outer frame yoke 110, the magnet group 140, the plurality of core pieces 120, and the inner frame yoke 115 from above. The cover plate 130 is provided with a plurality of slots 131 into which the protrusions 123 of the core pieces 120 are inserted.

The plurality of core pieces 120 are arranged at equal intervals in the circumferential direction. The rotor 102 of the present embodiment is provided with ten core pieces 120, thereby constituting ten magnetic poles 2N and 2S. That is, the rotor 102 of the present embodiment has ten poles.

The core piece 120 includes a core piece main body 121, an extended tooth portion 122, and a protrusion 123. Similarly to the above-described embodiment, the core piece main body 121 is in close contact with the pair of side magnets 141, the outer magnet 142, and the inner magnet 143.

Similarly to the above-described embodiment, the extended tooth portion 122 protrudes downward from the lower surface 141*b* of the side magnet and extends in the width direction from the core piece main body 121. Similarly to the modification described above, in the extended tooth portion 122, the width dimension in the circumferential direction of the extended tooth portion 122 is increased stepwise toward the radially outer side. According to the present embodiment, the same effects as those of the above-described embodiment and the modifications thereof can be obtained.

Figure 11:
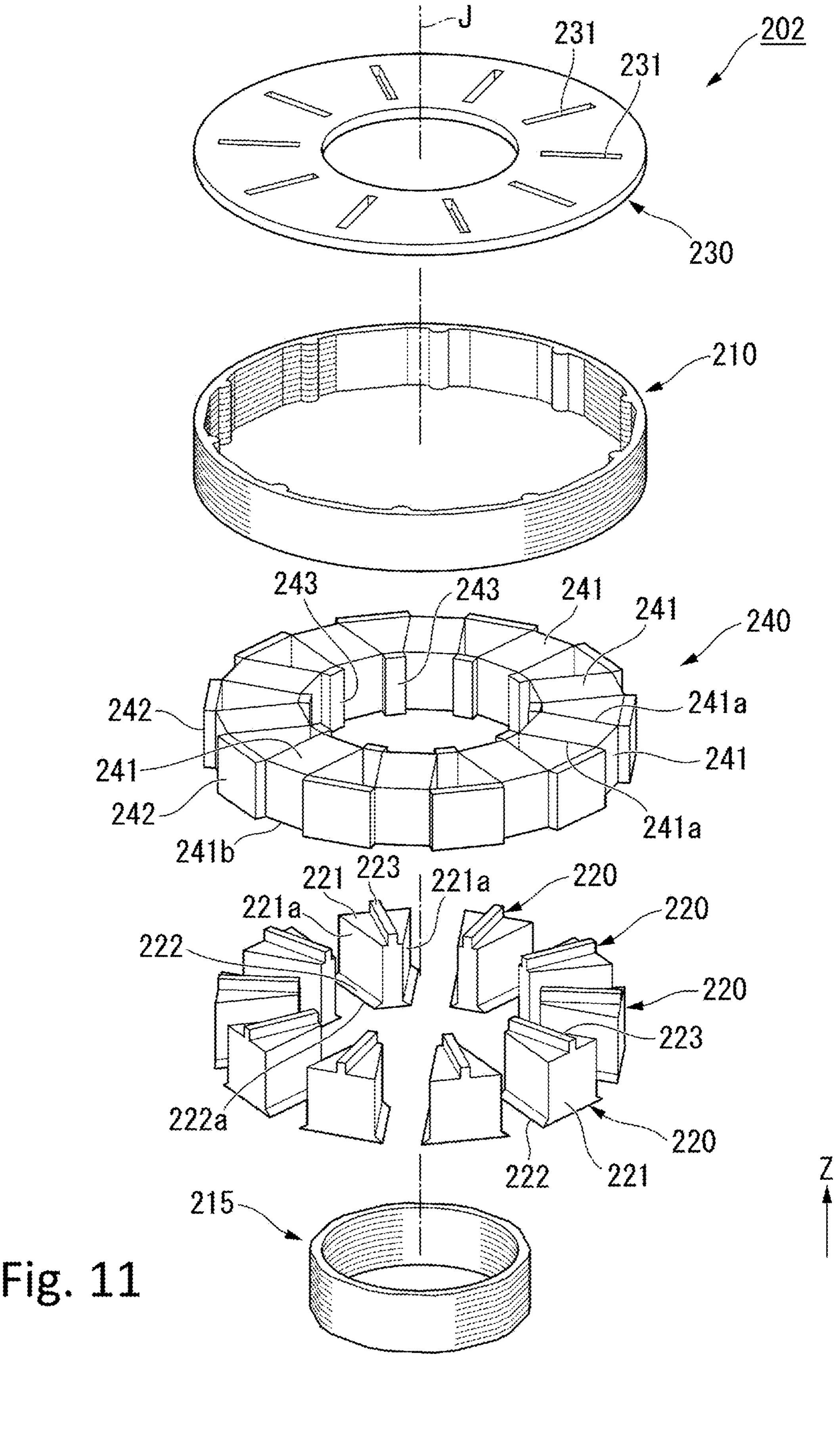
FIG. 11 is an exploded view of a rotor of a third embodiment.

FIG. 11 is an exploded view of a rotor 202 of a third embodiment.

The rotor 202 of the third embodiment constitutes a motor in combination with the stator 160 (see FIG. 9) of the second embodiment described above. The rotor 202 of the third embodiment is different from that of the first embodiment and the second embodiment mainly in the configurations of the core piece 220 and the side magnet 241.

The rotor 202 includes a cover plate 230, an outer frame yoke 210, a magnet group 240, a plurality of core pieces 220, and an inner frame yoke 215. The magnet group 240 includes ten side magnets 241, ten outer magnets 242, and ten inner magnets 243. The pair of side magnets 241, the outer magnet 242, and the inner magnet 243 are arranged around one core piece 220 similarly to the above-described embodiment.

The outer frame yoke 210 and the inner frame yoke 215 have an annular shape surrounding the central axis J similarly to the above-described embodiment. The inner frame yoke 215 is disposed radially inside the outer frame yoke 210. Similarly to the above-described embodiment, the magnet group 240 and the plurality of core pieces 220 are disposed between the inner frame yoke 215 and the outer frame yoke 210 in the radial direction. The outer frame yoke 210 is in close contact with the plurality of outer magnets 242 from the radially outer side. The inner frame yoke 215 is in close contact with the plurality of inner magnets 243 from the radially inner side.

Similarly to the above-described embodiment, the cover plate 230 covers the outer frame yoke 210, the magnet group 240, the plurality of core pieces 220, and the inner frame yoke 215 from above. The cover plate 230 is provided with a plurality of slots 231 into which the protrusions 223 of the core pieces 220 are inserted.

The core piece 220 of the present embodiment is made of, for example, a soft magnetic composite material. The plurality of core pieces 220 are arranged at equal intervals in the circumferential direction. The rotor 202 of the present embodiment is provided with ten core pieces 220, thereby constituting ten magnetic poles 2N and 2S. That is, the rotor 202 of the present embodiment has ten poles.

The core piece 220 includes a core piece main body 221, an extended tooth portion 222, and a protrusion 223. The core piece main body 221 extends in a columnar shape along the axial direction. The shape of the core piece main body 221 as viewed from the axial direction is an isosceles trapezoidal shape. In the core piece main body 221, among two sides parallel to each other when viewed from the axial direction, a short side is arranged on the radially inner side and a long side is arranged on the radially outer side, and two sides having the same length connecting them are arranged along the radial direction.

The core piece main body 221 has a pair of side surfaces 221*a* facing both sides in the circumferential direction. Each of the pair of side surfaces 221*a* is a flat surface extending along the radial direction. The pair of side surfaces 221*a* are separated from each other toward the radially outer side. Therefore, the width dimension in the circumferential direction of the core piece main body 221 is continuously increased toward the radially outer side.

The side magnet 241 of the present embodiment has a pair of side surfaces 241*a* facing both sides in the circumferential direction. The pair of side surfaces 241*a* are parallel to each other. The other surfaces of the side magnet 241 facing opposite sides are also parallel to each other. Therefore, the side magnet 241 of the present embodiment is a rectangular parallelepiped. The core piece 220 is disposed between the pair of side magnets 241 arranged in the circumferential direction. The side surface 241*a* of the side magnet 241 is in close contact with the side surface 241*a* of the core piece main body 221. According to the present embodiment, since the pair of side surfaces 241*a* of the side magnet 241 are parallel to each other, the side magnet 241 can be manufactured at low cost.

Similarly to the above-described embodiment, the extended tooth portion 222 protrudes downward from the lower surface 241*b* of the side magnet and extends in the width direction from the core piece main body 221. In the extended tooth portion 222 of the present embodiment, the width dimension in the circumferential direction is continuously increased toward the radially outer side. According to the core piece 220 of the present embodiment, the shape of the stator facing surface 222*a* can be increased in the circumferential direction on the radially outer side in accordance with the rotor facing surface 164*a* of the core portion 164 of the stator 160. As a result, the stator facing surface 222*a* can receive a force in a wide area from the core portion 164 of the stator 160 when the rotor 202 rotates, and the torque of the motor can be increased.

In the first to third embodiments described above, the extended tooth portion exists only on one side in the axial direction of the core piece main body, but the embodiment of the present disclosure is not limited thereto.

Figure 12:
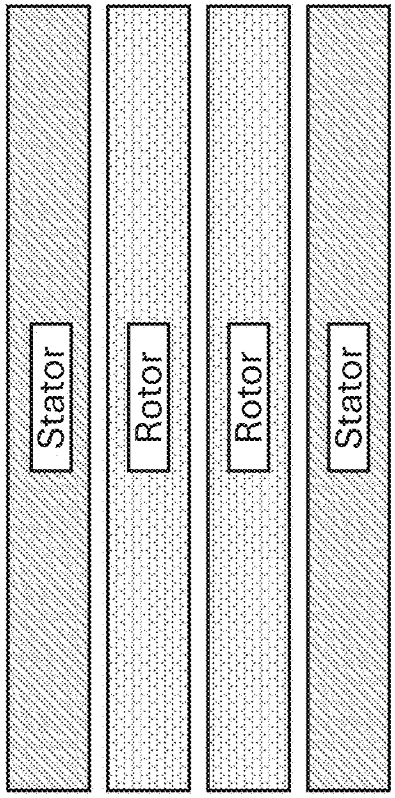
FIG. 12 is a side view of a motor of the first embodiment.

The core piece may have a form in which another extended tooth portion is provided on the other side in the axial direction of the core piece main body. In this case, the other extended tooth portion protrudes from another surface of the side magnet to the other side in the axial direction. The other surface faces the other side in the axial direction. In addition, the motor of the present disclosure may include another stator on the other side in the axial direction of the other extended tooth portion, and the surface on one side in the axial direction of the other stator faces the other end in the axial direction of the other extended tooth portion via another axial gap. That is, the motor of the present disclosure may be a double-stator and double-gap type axial gap motor, as seen in FIG. 12.

By adopting this configuration, the torque of the motor can be further increased.

While the preferred embodiments of the present disclosure have been described above with reference to the accompanying drawings, it is obvious that the present disclosure is not limited to the embodiments. Various shapes, combinations, and the like of the constituent members in the above embodiments are only by way of example, and various modifications are possible based on design requirements and the like without departing from the gist of the present disclosure.

The motor to which the present disclosure is applied is applicable to various devices. The motor is applicable to, for example, a rotary electric machine such as a generator. In this case, the rotary electric machine may be a three-phase AC generator. Application of the rotary electric machine is not particularly limited. For example, the rotary electric machine may be mounted on a vehicle or may be mounted on equipment other than a vehicle. The number of poles and the number of slots of the rotary electric machine are not particularly limited. In the rotary electric machine, a coil may be configured by any winding method. The features described above in the present description may be appropriately combined as long as no conflict arises.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor comprising:

a rotor rotatable about a central axis as a rotation axis; and a stator located on at least one side in an axial direction of the rotor;

wherein the rotor includes a plurality of side magnets whose magnetization direction is a circumferential direction, the plurality of side magnets being arranged in the circumferential direction, and a plurality of core pieces arranged between the side magnets in the circumferential direction;

the core piece includes a core piece main body that is in close contact with side surfaces of the side magnets on a pair of side surfaces facing both sides in the circumferential direction, and an extended tooth portion located on one side in the axial direction of the core piece main body;

the extended tooth portion protrudes to one side in the axial direction with respect to an axial surface of the side magnet, and has a larger width dimension in the circumferential direction than a width dimension in the circumferential direction of the core piece main body, wherein the core piece includes a plurality of steel plates stacked along a radial direction;

the plurality of steel sheets constituting the core piece include a plurality of types of steel sheets having different width dimensions in the circumferential direction of the extended tooth portion; and in the extended tooth portion, the width dimension in the circumferential direction of the extended tooth portion is increased stepwise toward a radially outer side.

2. The motor according to claim 1, further comprising another stator located on another side in the axial direction of the rotor, wherein the core piece includes another extended tooth portion located on the other side in the axial direction of the core piece main body, and the other extended tooth portion protrudes to the other side in the axial direction with respect to another axial surface of the side magnet, and has a larger width dimension in the circumferential direction than the width dimension in the circumferential direction of the core piece main body.

3. The motor according to claim 2, wherein;

the core piece includes a plurality of steel plates stacked along a radial direction; and the plurality of steel sheets constituting the core piece include a plurality of types of steel sheets having different width dimensions in the circumferential direction of the extended tooth portion and the other extended tooth portion; and in the extended tooth portion and the other extended tooth portion, the width dimension in the circumferential direction of each of the extended tooth portion and the other extended tooth portion is increased stepwise toward a radially outer side.

4. The motor according to claim 1, wherein the rotor includes a plurality of outer magnets that are in close contact with surfaces of the core pieces facing radially outward.

5. The motor according to claim 4, wherein;

the rotor includes an outer frame yoke in an annular shape surrounding the central axis; and the outer frame yoke is in close contact with the plurality of outer magnets on an inner surface facing radially inward.

6. The motor according to claim 1, wherein the rotor includes a plurality of inner magnets that are in close contact with surfaces of the core pieces facing radially inward.

7. The motor according to claim 6, wherein;

the rotor includes an inner frame yoke in an annular shape surrounding the central axis; and the inner frame yoke is in close contact with the plurality of inner magnets on an outer surface facing radially outward.

8. A motor comprising:

a rotor rotatable about a central axis as a rotation axis; and a stator located on at least one side in an axial direction of the rotor;

wherein the rotor includes a plurality of side magnets whose magnetization direction is a circumferential direction, the plurality of side magnets being arranged in the circumferential direction, and a plurality of core pieces arranged between the side magnets in the circumferential direction;

the core piece includes a core piece main body that is in close contact with side surfaces of the side magnets on a pair of side surfaces facing both sides in the circumferential direction, and an extended tooth portion located on one side in the axial direction of the core piece main body; and the extended tooth portion protrudes to one side in the axial direction with respect to an axial surface of the side magnet, and has a larger width dimension in the circumferential direction than a width dimension in the circumferential direction of the core piece main body, wherein in the extended tooth portion, the width dimension in the circumferential direction is continuously increased toward a radially outer side.

9. The motor according to claim 8, wherein;

in the core piece main body, the width dimension in the circumferential direction is continuously increased toward a radially outer side; and a pair of side surfaces of the side magnet facing both sides in the circumferential direction are parallel to each other.

10. The motor according to claim 8, further comprising:

a flux barrier portion, wherein the rotor further comprises an outer frame yoke, and the flux barrier portion is between the outer frame yoke and at least one of the plurality of side magnets.

11. A motor comprising:

a rotor rotatable about a central axis as a rotation axis; and a stator located on at least one side in an axial direction of the rotor;

wherein the rotor includes a plurality of side magnets whose magnetization direction is a circumferential direction, the plurality of side magnets being arranged in the circumferential direction, and a plurality of core pieces arranged between the side magnets in the circumferential direction;

the core piece includes a core piece main body that is in close contact with side surfaces of the side magnets on a pair of side surfaces facing both sides in the circumferential direction, and an extended tooth portion located on one side in the axial direction of the core piece main body; and the extended tooth portion protrudes to one side in the axial direction with respect to an axial surface of the side magnet, and has a larger width dimension in the circumferential direction than a width dimension in the circumferential direction of the core piece main body, wherein in the extended tooth portion, the width dimension in the circumferential direction is continuously increased toward one side in the axial direction.

12. The motor according to claim 11, further comprising:

a flux barrier portion, wherein the rotor further comprises an outer frame yoke, and the flux barrier portion is between the outer frame yoke and at least one of the plurality of side magnets.

13. The motor according to claim 1, wherein;

the rotor includes a cover plate that covers end surfaces on another side in the axial direction of the plurality of side magnets;

the cover plate is made of a non-magnetic material;

the cover plate is provided with a plurality of slots arranged along the circumferential direction and extending along the radial direction; and the core piece has a protrusion that protrudes from the core piece main body to the other side in the axial direction and is inserted into the slot.

14. The motor according to claim 1, comprising:

a pair of the rotors; and the stator disposed between the pair of rotors in the axial direction.

15. The motor according to claim 1, further comprising:

a flux barrier portion, wherein the rotor further comprises an outer frame yoke, and the flux barrier portion is between the outer frame yoke and at least one of the plurality of side magnets.

16. The motor according to claim 1, wherein a pair of side surfaces facing both sides in the circumferential direction of the core piece main body are parallel to each other.

17. The motor according to claim 16, wherein;

the plurality of steel sheets constituting the core piece include a plurality of types of steel sheets having different width dimensions in the circumferential direction of the extended tooth portion; and in the extended tooth portion, the width dimension in the circumferential direction of the extended tooth portion is increased stepwise toward a radially outer side.

* * * * *